United States Patent [19]

Vo Dinh et al.

[11] Patent Number: 4,737,304

[45] Date of Patent: Apr. 12, 1988

[54] POLYAMIDE-IMIDE POWDERS, COMPOSITIONS CONTAINING THE SAME AND METHOD OF MAKING THE POWDERS

[75] Inventors: Man Vo Dinh, Serquigny; Jean-Paul Merval, Brionne, both of France

[73] Assignee: Atochem, France

[21] Appl. No.: 916,636

[22] Filed: Oct. 8, 1986

[30] Foreign Application Priority Data

Oct. 8, 1985 [FR] France ................ 85 14874

[51] Int. Cl.$^4$ .................. C10M 133/56; C08G 18/18
[52] U.S. Cl. ............... 252/51.5 R; 252/54.6; 528/73
[58] Field of Search ............ 252/51.5 R; 528/73

[56] References Cited

U.S. PATENT DOCUMENTS

| | | | |
|---|---|---|---|
| 3,651,024 | 3/1972 | Blensan et al. ........... | 260/78 L |
| 3,657,194 | 4/1972 | Blensan et al. ........... | 260/78 L |
| 3,705,871 | 12/1972 | Blensan et al. ........... | 260/33.6 R |
| 4,185,965 | 1/1980 | Schlicht et al. ........... | 252/51.5 R |
| 4,294,952 | 10/1981 | Mukoyama et al. ........... | 528/73 |
| 4,447,589 | 5/1984 | Nishizawa et al. ........... | 528/73 |
| 4,464,489 | 8/1984 | Noda et al. ........... | 528/73 |
| 4,472,567 | 9/1984 | Zecher et al. ........... | 528/73 |
| 4,497,944 | 2/1985 | Nishizawa et al. ........... | 528/73 |
| 4,549,006 | 10/1985 | Zecher et al. ........... | 528/73 |
| 4,569,776 | 2/1986 | Miller et al. ........... | 252/77 |
| 4,624,981 | 11/1986 | Zecher et al. ........... | 524/326 |

FOREIGN PATENT DOCUMENTS

| | | | |
|---|---|---|---|
| 750427 | 1/1945 | Fed. Rep. of Germany ..... | 252/51.5 R |
| 8501274 | 1/1985 | France ........... | 252/51.5 R |

OTHER PUBLICATIONS

Autochem, Australia published application, No. 40,479.

Primary Examiner—William R. Dixon, Jr.
Assistant Examiner—Ellen McAvay
Attorney, Agent, or Firm—Sigalos & Levine

[57] ABSTRACT

The process for the manufacture of infusible and insoluble polyamide-imide powders of spheroidal form comprising first reacting at least one lactam in solution with a polyamide generator in the presence of an anionic polymerization catalyst and then adding to the polymerization reaction a polyisocyanate in an amount sufficient to first activate said polymerization and then to react with the polyamide chains being formed and to bridge the same; the resultant product; and lubricants comprising a lubricating fluid and the resultant product.

12 Claims, No Drawings

POLYAMIDE-IMIDE POWDERS, COMPOSITIONS CONTAINING THE SAME AND METHOD OF MAKING THE POWDERS

BACKGROUND OF THE INVENTION

The object of the present invention are infusible polyamide-imide powders whose very fine grains have a spheroidal form.

By polyamide-imides, we mean infusible (unmeltable) polymers (because they possess a three-dimensional lattice) resulting from the reaction of polyisocyanates with polyamides or copolyamides of molecular weight equal to or above 200.

Certain ones of these polyamide-imides have already been described. See particularly PATENTSCHRIFT No. 750,427 published in Germany May 25, 1944.

In order to make such polyamide-imide powders, the standard methods for the manufacture of polyamide powders cannot be used.

Those procedures utilizing a solution and precipitation by a non-solvent or by lowering of the temperature are inoperative since these polyamide-imides are insoluble in solvents because of their three-dimensional lattice.

Such powders also cannot be obtained by chemical conversion of very fine polyamide powders of spheriodal form (for instance, those obtained in French Patent Application No. 8501274) since if, for instance, one would cause a polyisocyanate to react with them at moderate temperatures, there would be a conversion into polyamide-imide only superficially and, on fusion (melting) there would be destruction of the spheriodal form.

Moreover, the crushing, either at ordinary temperature or cryogenically, of pieces of polyamide-imide leads to a coarse powder whose irregular pieces have the form of fragments (chips) whereas the powders which we claim have a very regular shape; they are in fact composed of very fine grains of spheroidal shape whose diameter is between 2 to 40 microns.

The literature describes fabrication procedures of polyamide powders by the anionic polymerization of lactams in solution (French Pat. Nos. 1,601,194, 1,601,195, 1,602,751, French Patent Applications Nos. 8501274 and 8504739), but all of the powders thus obtained are polyamide or copolyamide powders (and not polyamide-imide powders) which are fusible (meltable) and soluble in solvents such as m-cresol, hexafluoroisopropanol and the like.

SUMMARY OF THE INVENTION

The present invention provides a process for making these infusible (unmeltable) polyamide-imide powders of regular form and fine granulometry, the resultant powders, and compositions utilizing such powders.

Briefly, the present invention comprises a process for the manufacture of infusible and insoluble polyamide-imide powders of spheriodal form comprising first reacting at least one lactam which is a polyamide generator in solution in the presence of an anionic polymerization catalyst of said lactam and then adding to the polymerization reaction a polyisocyanate in an amount sufficient to first activate said polymerization and then to react with the polyamide chains being formed and to bridge the same.

The invention also comprises the resultant powders and lubricants containing such powders.

DETAILED DESCRIPTION

As noted, the instant process comprises first reacting at least one lactam which is a polyamide generator, in solution in the presence of an anionic polymerization catalyst of said lactams and then a polyisocyanate in sufficient quantity so that it activates first of all said polymerization and then reacts with the chains of polyamides formed.

These reactions can take place in the presence of a finely divided mineral charge and they can likewise take place in the presence of an N,N'-alkylene bisamide.

Any lactam which is a generator of polyamide can be used in the invention. Examples of these which have acquired industrial importance are caprolactam, oenantholactam, capryllactam, and lauryllactam.

By the use of mixtures of these lactams, one obtains copolyamide-imide powders.

Any anionic polymerization catalyst of these lactams can be used. Examples, amongst others, are sodium, sodium hydride, sodium methylate, sodium (metallic) amide, alkaline lactamates, carbon dioxide and the like.

The polyisocyanate used, whether it is solid, liquid or gaseous, must be soluble in the reaction medium and it can be aliphatic or aromatic. Examples are xylylene diisocyanate, isophorone diisocyanate, 1,5-naphthalene diisocyanate, 4,4'-diphenylmethane diisocyanate, 4,4',4"-triphenylmethane triisocyanate, 2,4-toluene diisocyanate and the like.

Particularly well suitable are hexamethylenediisocyanate and 2,4,4-tri-methyl-1,6-hexamethylene diisocyanate.

The isocyanates in general are mentioned in the prior art as activators; but in fact only the monoisocyanates are cited expressly therein. The monoisocyanates cannot cross-link polyamides and, as a result, lead to infusible (unmeltable) polyamide-imides.

If we were dealing with polyisocyanates, one can think that they would be used in the same amounts as those indicated for the monoisocyanates, that is to say low amounts (the number of NCO groups per 100 molecules of lactam not exceeding the value of 3) and that, under these conditions, no cross-linking would yet be possible.

In the present invention, no isocyanate whatever is used, but there is used a polyisocyanate. Furthermore, it is used in a high amount; in such a quantity that the number of NCO groups which it contributes is at a minimum of 20 for 100 molecules of lactam.

The result of this is that the polyisocyanate, after having contributed conjointly with the catalyst to the creation and growth of the polyamide or copolyamide chains, then reacts with the free amine functional groups at the ends of these chains and, above all, with the amide functional groups of these chains in order to bridge them by the formation of imide functional groups.

It is thus that in the case of chains resulting from the polymerization of lauryllactam:

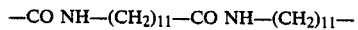

in the presence of hexamethylene-1,6-diisocyanate

there will be the following bridging:

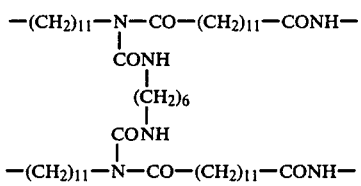

The degree of bridging increases with the polyisocyanate content. Thus, by performing successive tests, with the same dose of lactam but by increasing with each test the dose of polyisocyanate, one obtains polymer powders which at the start are composed of pure polyamides, then, little-by-little, polyamide-imides whose imide group content (and as a consequence the infusibility (unmeltability)) only increases to the detriment of the amide groups, without however being able to attain pure polyimides, no longer containing a single amide group, as a result of steric hindrances.

One can follow the progress of this reaction, either by IR spectroscopy, or very simply by an empirical method consisting of sprinkling polymer powder in a thin layer on a steel plate of dimensions 100×200×3 mm raised to 350° C. by heating for 10 minutes in an oven regulated at 350° C. and of observing the behavior of these grains of powder; i.e., whether they yield a film, whether they agglomerate with each other, or whether they stick to the plate.

One can likewise observe the behavior of this powder in meta-cresol at 80° in which only pure polyamides are soluble.

As stated above, one can also add a finely divided mineral charge such as talc, silica, and the like to the reaction medium, so as to introduce seeds of crystallization, provided that this charge is perfectly anhydrous. From about 0.1 to 1 part by weight with respect to the lactam suffice to ensure this function.

One can likewise add an N,N'-alkylene bisamide such as, amongst others, N,N'-ethylene bis stearamide or N,N'ethylene bis oleamide. The mode of action of these special amides has been specified in the already cited French Patent Application No. 8501274.

The solvent, constituting the reaction medium, must be perfectly anhydrous and it must dissolve the lactam and be inert with respect to the other compounds used in the procedure.

It has a boiling point between 80° and 200° C.; this can be an aliphatic hydrocarbon of the paraffin type, for example, or cycloparaffinic hydrocarbon or aromatic hydrocarbon such as xylene or toluene (halogenated or unhalogenated).

Due to their special physical properties, the infusible (unmeltable) polyamide-imide powders thus obtained have very interesting applications.

One application which likewise is the object of the present invention consists of using them as additives to conventional lubricant fluids, such as oils, to replace the graphite, molybdenum bisulfide or the powders of thermoplastic substances which already have been proposed for this purpose. (Note, for example, U.S. Pat. No. 1,036,542 which mentions for that use the powders of polyamides, polyacetals, polytetrafluoroethylene.) The polyamide-imides can be added in any amount effective to increase the lubricating effectiveness of the lubricating fluid. The amounts will vary dependent upon the particular lubricating fluid used, but can readily be determined by routine experimentation.

For this very special application, it is of interest to use a polyamide-imide powder containing a high charge of silica. It has been in fact observed that such a powder (obtained by introducing into the reaction medium doses of finely dispersed silica, which are greater than the several per thousand required to facilitate the formation of this powder, as stated above) remained perfectly in suspension in the oil to which it was added. This is due (besides the density which was modified) to the thixotropic qualities contributed by the silica.

This result is acquired by the use of at least 4 percent of silica by weight with respect to the lactam, this silica having grains of a diameter between 2 and 40 millimicrons.

The invention will be further illustrated by the following examples which are set forth for purposes of illustration only. In the examples, the fabrication trials were carried out in a reactor of 20-liter capacity, equipped with an agitator with blades, a double jacket in which the heating oil circulates, a bottom outlet, and an introduction chamber for the reactants flushed with dry nitrogen.

An azeotropic distillation device under vacuum makes it possible to eliminate all traces of water from the reaction medium.

The solvent is a paraffinic hydrocarbon cut whose boiling range is between 130° and 160° C.

EXAMPLE 1

One introduces the following successively into the reactor, under nitrogen, at ordinary temperature and under low agitation:
(i) 13 liters of solvent;
(ii) 45 grams of N,N'-ethylene bis stearamide (EBS);
(iii) 300 grams of finely dispersed silica (Aerosil R974 from the DEGUSSA Company) perfectly dehydrated; and
(iv) 3000 grams of caprolactam (i.e., 26.54 moles.

Agitation is started at low speed and heating takes place progressively up to 110° C. Once this temperature has been reached, the speed of agitation is raised to 360 RPM and a distillation at 110° C. for 60 minutes makes it possible to eliminate all traces of water.

22.9 grams of sodium hydride at 50% of HNa are then introduced under nitrogen and allowed to react for 10 minutes with the caprolactam.

Having adjusted the temperature to 115° C., 900 grams of hexamethylene diisocyanate (contributing 40.4 groups of NCO per 100 moles of caprolactam) diluted in 2 liters of solvent, are introduced in 4 hours, still under agitation of 360 RPM.

At the end of the injection, the temperature is still kept at 115° C. and the agitation at 360 RPM for 30 minutes, then cooling takes place and the powder is dried at 100° C.

After drying under vacuum in order to eliminate all traces of solvent, washing in an aqueous phosphoric acid solution in order to destroy the traces of catalyst, and then drying in vacuo at 80° C., a powder is obtained whose perfectly spherical grains have a diameter between 2 and 10 microns.

It is infusible (unmeltable) on testing the plate at 350° C. and insoluble in m-cresol at 80° C.

EXAMPLE 2

The method of Example 1 was followed except that there were used:

(i) 3000 grams of lauryllactam (i.e., 15.23 moles);
(ii) 45 grams of EBS;
(iii) 300 grams of silica;
(iv) 12.6 grams of sodium hydride; and
(v) 517 grams of hexamethylene diisocyanate or 40.4 groups of NCO per 100 moles of lauryllactam.

As in Example 1, one obtains a powder with grains having a diameter between 2 and 10 microns.

EXAMPLE 3

(a) Two dispersions were prepared in the standardized oil Neutral 200; one containing 3% of the polyamide-imide powder prepared according to Example 1 above, the other one containing 3% of polytetrafluoroethylene (PTFE) powder commercially sold by the firm of REINER-CHEMIE (RFA).

(b) These two dispersions were subjected to comparative tests on a ball-plate machine which allows registering the friction torque of a small ball on a disk (plate) as a function of the temperature, by utilizing the following conditions:

(i) Disk made of steel XC 38;
(ii) Corrugation of the disk: 0.2 mm, measured by a profilometer;
(iii) Ball: 5 mm made of steel $100C_6$;
(iv) Sliding speed: 0.15 cm/s;
(v) Load applied: 1 daN;
(vi) Temperature rise: 5° C./minute;
(vii) Quantity of dispersion of oil per test: 0.3 g; and
(viii) Stopping of the machine at 400° C. or at the time of a rapid increase of the friction coefficient.

(c) The table below shows that the differences of the friction coefficients are very slight and that the polyamide-imide powder prepared according to Example 1 is practically equivalent to the tested PTFE powder.

| Dispersion subjected to test | Friction coefficient at different temperatures in °C. | | | | | | | |
|---|---|---|---|---|---|---|---|---|
| | 20 | 100 | 150 | 200 | 250 | 300 | 350 | 400 |
| Neutral oil 200 + 3% of PTFE | 0.16 | 0.16 | 0.16 | 0.16 | 0.16 | 0.16 | 0.22 | 0.28 |
| Neutral oil 200 + 3% of polyamide-imide of Example 1 | 0.18 | 0.18 | 0.18 | 0.17 | 0.17 | 0.18 | 0.22 | 0.22 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. The process for the manufacture of infusible and insoluble polyamide-imide powders of a spheroidal form comprising first reacting only at least one lactam, which is a polyamide generator, dissolved in a solvent selected from paraffinic, cycloparaffinic or aromatic hydrocarbons in the presence of an anionic-polymerization catalyst of said lactam and then adding to the polymerization reaction a polyisocyanate soluble in solvent in an amount sufficient to first activate said polymerization and then to react with the polyamide chains being formed and to bridge the same.

2. The process of claim 1, wherein a finely divided mineral is added to said lactam solution.

3. The process of claim 2, wherein said mineral is added in an amount of from about 0.1 to 1 part by weight for each 100 parts by weight of lactam in said lactam solution.

4. The process of claim 3, wherein micronized silica is added to said lactam solution in an amount of at least 4 parts by weight for each 100 parts by weight of lactam.

5. The process of claim 3 or 4, wherein an N,N'-alkylene bis amide is added to the lactam solution.

6. The process of any one of claims 1 to 4, wherein the quantity of polyisocyanate added is such that there are a minimum of 20 NCO groups per 100 molecules of lactam.

7. The process of any one of claims 1 to 4, wherein the polyisocyanate is selected from 1,6-hexamethylene diisocyanate or 2,4,4-trimethyl-1,6-hexamethylene diisocyanate.

8. The process of any one of claims 1 to 4, wherein said at least one lactam is selected from caprolactam or lauryllactam.

9. The product of the process of claim 1, 2, 3, or 4.

10. The product of the process of claim 1, 2, 3, or 4, wherein the mean diameter of the powder grains is between about 2 and 40 microns.

11. A lubricant comprising a lubricating fluid and the product of the process of any one of claims 1 to 4.

12. A lubricant comprising a lubricating oil and the product of the process of any one of claims 1 to 4, wherein the mean diameter of the powder grains is between about 2 and 40 microns.

* * * * *

UNITED STATES PATENT AND TRADEMARK OFFICE
CERTIFICATE OF CORRECTION

PATENT NO. : 4,737,304

DATED : April 12, 1988

INVENTOR(S) : Vo Dinh et al

It is certified that error appears in the above-identified patent and that said Letters Patent are hereby corrected as shown below:

In column 6, line 16 (Claim 1), insert --the-- before solvent.

Signed and Sealed this

Sixteenth Day of August, 1988

Attest:

DONALD J. QUIGG

Attesting Officer

Commissioner of Patents and Trademarks